United States Patent [19]

Mizuno et al.

[11] 4,020,552

[45] May 3, 1977

[54] MOWING APPARATUS

[75] Inventors: Hitoshi Mizuno; Satoshi Akiyama, both of Odawara, Japan

[73] Assignee: Kabushiki Kaisha Shikutani, Odawara, Japan

[22] Filed: Apr. 19, 1976

[21] Appl. No.: 678,456

[30] Foreign Application Priority Data

Feb. 3, 1976 Japan .............................. 51-10047

[52] U.S. Cl. ................................... 30/276; 56/12.7
[51] Int. Cl.² ..................... A01D 35/26; A01G 3/06
[58] Field of Search .............. 30/276, 347; 56/12.7, 56/16.9, 295

[56] References Cited

UNITED STATES PATENTS

| | | | |
|---|---|---|---|
| 3,826,068 | 7/1974 | Ballas | 30/276 X |
| 3,859,776 | 1/1975 | Ballas | 30/276 X |

FOREIGN PATENTS OR APPLICATIONS 556,632  8/1973  Switzerland .......................... 30/276

*Primary Examiner*—Al Lawrence Smith
*Assistant Examiner*—J. C. Peters
*Attorney, Agent, or Firm*—Birch, Stewart, Kolasch and Birch

[57] ABSTRACT

An improved mowing apparatus of the type having a rotatable reel-like casing about which a cutting string made of a high polymer synthetic material is directly wound. The coiled string is protected by a cap which is detachably mounted on the casing and locked for rotation therewith. The free end of the coiled string extends outwardly from the cap through one of guide ports provided in the peripheral wall of the cap, in order to form a cutting flail with an effective working length. The cap is elastically arranged to disengage from locking engagement with the casing for rotation relative thereto, so that the string may easily be payed out as the working flail becomes shortened through wear.

7 Claims, 7 Drawing Figures

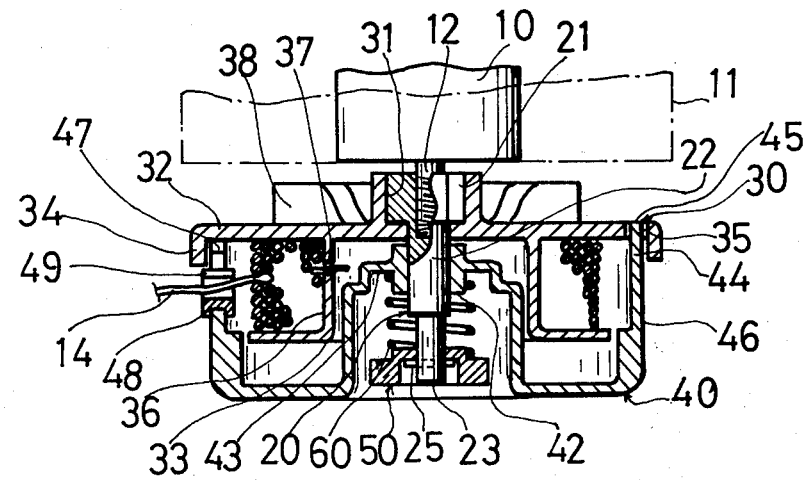
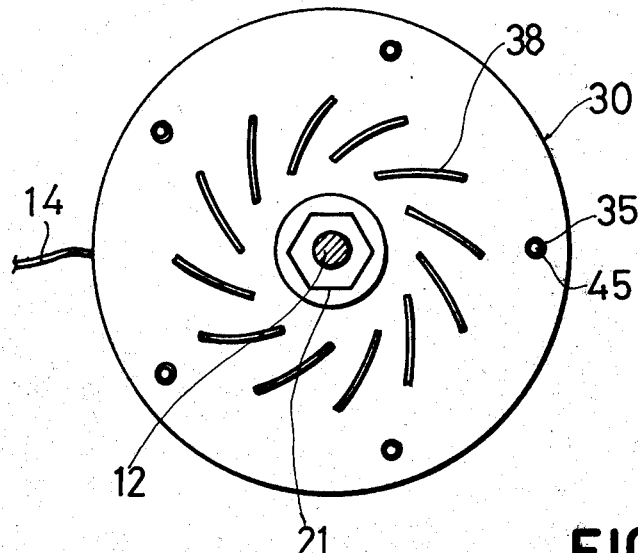
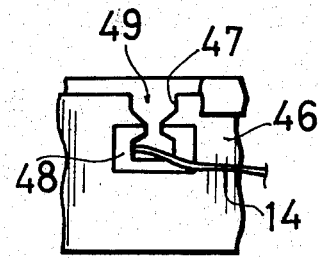
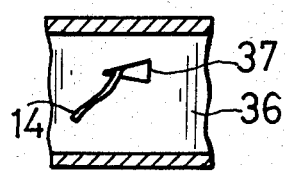

MOWING APPARATUS

BACKGROUND AND SUMMARY OF THE INVENTION

The present invention relates to mowing machines of the type having a cutting assembly rotatable in a cutting plane and more particularly to a rotary reel-like casing about which a cutting line made of a high polymer synthetic material is directly coiled.

The field of technology to which the present invention is directed is mowing apparatus of a type wherein a rotary assembly is provided with a coiled nonmetallic line, the effective working length of the line being adapted to be lengthened at desired times while it is in a non-working condition, as the working length becomes shortened during use. Nylon monofilament strings which are almost completely incapable of causing any significant injury to persons or animals struck by the flailing cutting string are effective for use as safe, rotary cutting means. These strings are particularly suitable for cutting or trimming along fences, walls and the trunks or stems of trees.

There is illustrated and described in U.S. Pat. Nos. 3,708,967; 3,826,068; and 3,859,776 one or more embodiments of a mowing device having a rotary head member arranged to be rotated by a gasoline-powered engine or electric motor together with one or more spools which is housed in lockable relation to the rotary head member. A length of flexible nonmetallic line is coiled about the spool and its free end extends peripherally from the spool and the head. The free end swings arcuately about upon the actuation of the engine or motor to cut adjacent vegetation in the manner of a flail. The line storage means in the form of spools is locked from rotation but is releasable so that additional line may be payed out as the effective working length of the line becomes shortened during use.

However, the aforementioned device is subject to certain disadvantages due to having the storage means in the form of spools provided separately from the rotary head member. One of the disadvantages is that the rotary head is complicated in order to provide a means for locking and releasing the spool. As a matter of course, means provided on the rotary head must be as simple as possible because of rotating at high speeds. Also, the device inconveniently needs two procedures of winding a cutting line about the spool and storing the line wound about the spool within the rotary head. Another inconvenience is that the full length of the coiled line or a period of time for replacement of the line is relatively short, because the rotary head has its inside space spared both to the line and to the spool.

In accordance with the present invention aiming to eliminate the aforementioned disadvantages, the apparatus includes an output axis rotatably mounted at one end or a supporting means and connected to a prime mover or a transmission driven thereby. A rotary casing is detachably secured to the output axis for rotation therewith in a cutting plane. The casing consists of a reel-like part and a cap-like part. The reel-like part is composed of upper and lower disk portions and an intermediate cylinder portion about which a cutting line made of a high polymer synthetic material is wound. The cap-like part covers therein the cylinder and lower disk portions together with the coiled line. The cap-like part is mounted on the reel-like part for rotation therewith. A fastening portion is detachably mounted on the output axis for elastically fixing the cap-like part to the reel-like part. The line extends outwardly through one of guide ports provided in the hollow cylindrical wall of the cap-like part to form a cutting flail having an effective working length. The line is made of a high polymer synthetic material which is flexible and yielding to the extent that it is substantially incapable of causing damage or injury when impacting against persons or animals.

The apparatus has the reel-like part as well as the cap-like part elastically pressed to the output axis by a coil spring interposed between the bottom of the cap-like part and a washer detachbly mounted on the output axis. Therefore, when the washer is dismounted, the reel-like part as well as the cap-like part may be easily removed from the output axis and then ready for storing or coiling the cutting line. The cap-like part is depressible from the reel-like part at a distance so as to be rotatable with respect to the reel-like part. Accordingly, an additional line may be payed out by rotating the cap-like part relative to the reel-like part as the effective working length becomes shortened during use.

The apparatus of the present invention contains neither spools separated from a rotary casing nor screws to be operated and therefore is simple in construction and easy for use. The rotary casing has a large inside space spared for line-storage so as to contain a long cutting line for its size. In one embodiment of the present invention, the cylinder portion is formed with a slot having an acute apex in which one end of the line is tightly wedged. A guide port in the form of an open circle is inserted in the underside of an open 8-shaped slit formed in the hollow cylindrical wall of the cap-like part, so that the uncoiled end of the line is easily passed through and well located in it.

In summary, it is an object of the present invention to provide an improved mowing apparatus having a rotary casing in the form of a reel on which a cutting string is immediately coiled.

Another object of the present invention is to provide an improved mowing apparatus which is simple in construction, easy in use and long in a period of renewal.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIG. 1 is a side view, partly in central section, of a relevant portion of the apparatus of the present invention showing a rotary assembly and a cutting string wound therein;

FIGS. 2 and 3 are top and bottom plan views of the rotary assembly shown in FIG. 1, respectively;

FIGS. 4 – 6 are somewhat enlarged views of parts of the apparatus shown in FIG. 1, illustrating a slot to which one end of the cutting string is connected, a guide through which the other end of the string is pulled out outwardly from the assembly, and a washer formed with a groove and a slot, respectively.

DETAILED DESCRIPTION OF THE PREFERRED EMBODIMENTS

Figure 3:
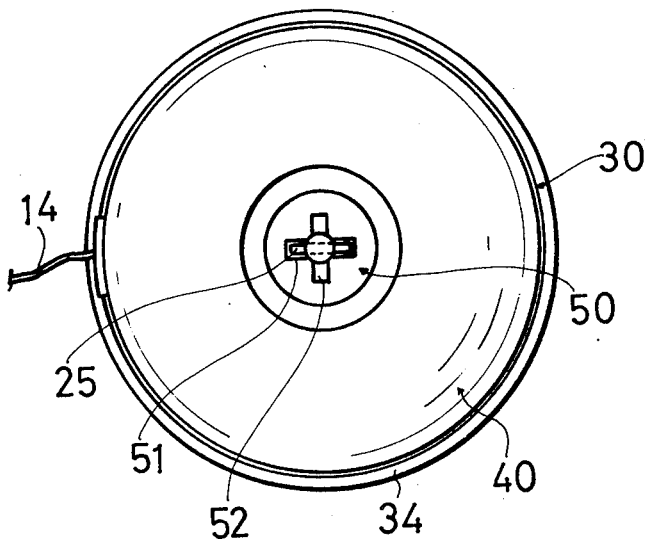
Figure 6:
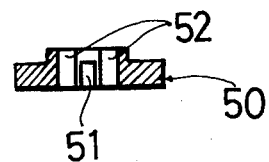

Referring to FIGS. 1 – 6, the portable-type mower of the present invention includes a prime mover in the form of a gasoline powered engine (not shown) of which the rotational movement is transmitted to a rotary assembly via rotary drive axis inside tubular shaft (not shown) and transmission within a head housing 10. For use with an electic motor as a prime mover, the motor is contained in somewhat enlarged head housing 11 as shown by broken lines in FIG. 1. The output axis 12 of the transmission or electric motor elongates downwardly and has the screw portion arranged for threading engagement with stepped axis 20. The stepped axis is composed of a head portion 21 of a polygonal, preferably hexagonal, cross-section, an intermediate portion 22 of a circular cross-section, and an end portion 23 of a smaller circular cross-section. The rotary assembly includes a reel-like casing 30 and a cap-like cover 40 coupled with each other. The reel-like casing and cap-like cover are preferably made of a high polymer synthetic material. Polygonal or hexagonal head portion 21 is arranged to be closely fitted in the center-bored polygonal or hexagonal recess 31 formed in the center of reel-like casing 30. Thus, the rotary assembly or reel-like casing 30 is detachably secured to the output axis.

Reel-like casing 30 consists of upper and lower disk portions 32 and 33 and a cylinder portion 36 interposed therebetween. The upper disk portion 32 is in diameter larger than the lower disk portion 33 and at its periphery formed with an annular rim 34. Cap-like cover 40 has a centrally upwardly recessed bottom portion 43 and a peripheral wall portion 46 for coupling engagement with the annular rim 34. Cap-like cover 40 is provided on the top surface of peripheral wall 46 with a plurality of peripherally equidistantly disposed upward projections 45 for fitting engagement with respective bores 35 formed in upper disk portion 32 of reel-like casing 30, as shown clearly in FIGS. 1 and 2. Cooling fans 38 are preferable to be mounted on the top surface of upper disk portion 32.

A cutting string 14 made of a high polymer synthetic material, such as nylon filament, is immediately coiled about cylinder portion 36 to fill a hollow cylindrical space defined by upper, lower and cylinder portions 32, 33 and 36. As illustrated most clearly in FIG. 4, the cylinder portion 36 is formed in its outer surface with a slot 37 in the form of an equilateral triangle having an acute apex pointed in the peripheral direction. The string 14 has its initial end tightly wedged in the slot and is wound in the direction pointed by the apex. As shown clearly in FIG. 5, the peripheral wall 46 of cap-like cover 40 is formed with one and more open 8-shaped slit 47 of which in the underside is inserted a guide port 48 in the form of a top-open circle. The slit and guide port are open as wide as the thickness of string, so that the free end of the string 14 may easily entered and, once entered, well located therein. Accordingly, the string will neither make a contact with the rotary assembly nor inflict on each other during rotation. Preferably, the guide port is made of a high polymer synthetic material and placed in height in the middle of cylinder portion 36.

Stepped axis 20 has the end portion 23 provided with a pin 25 diametrically projecting therefrom. The pin is shorter than the diameter of the center bores in reel-like casing 30 and cap-like cover 40. A washer 50 detachably mounted on end portion 23 is formed in its underside with a groove 51 and a slot 52 each adapted for fitting engagement with pin 25 put through the end portion, as illustrated clearly in FIGS. 3 and 6. A coil spring 60 mounted on end portion 23 is interposed between washer 50 and centrally upwardly recessed bottom 43 of cap-like cover 40. The coil spring is arranged to be so compressed as to force up cap-like cover 40 against reel-like casing 30 when pin is set in groove 51. On the other hand, when the pin is set in slot 52, washer 50 is removable from end portion 23 due to having slot 52 formed larger than pin 25 and, therefore, coil spring 60, cap-like cover 40 and reel-like casing 30 may be detached from stepped axis 20, by turns.

The manner of storage procedure of the rotary assembly will be explained particularly with reference to FIGS. 1 – 6. The reel-like casing 30 as well as the cap-like cover 40 are removed from the stepped axis 20 at a single touch-like operation by depressing the washer 50 against the coil spring 60 to set the pin 25 in the slot 52 from the groove 51. After one end portion of string 14 of a proper length, for example a length about ten times as long as the thickness of string, has been fixedly wedged into the apex of slot 37 in the cylinder portion 36, the string 14 is directly wound about cylinder portion 36 of reel-like casing 30 to the extent that the coiled string becomes in diameter almost the same as the lower disk portion 33 of reel-like casing 30. Thereafter, cap-like cover 40 is mounted on stepped axis 20 with the upward projections 45 fitted in the respective bores 35 and then the other uncoiled end portion of an appropriate length, for example a length about one hundred times as long as the thickness of string, is passed into the guide port 48 through the slit 47 to extend outwardly from the cap-like cover as a cutting flail with an effective working length. Finally, coil spring 60 and washer 50 are again mounted on end portion 23 of stepped axis 20 before pin is set in groove 51. Thus, the rotary assembly is ready for rotation.

Upon actuation of the prime mover, the rotary assembly is rotated at a desired rotational speed, whereby the cutting flail extends radially, outwardly in a rigid manner from the cap-like cover 40 within its cutting line, and whereby mowing or the like may be accomplished safely and efficiently. It should be understood the apparatus of the present invention is simple in construction and easy to use because of having neither spools separated from the casing nor screws to be operated. The apparatus of the present invention due to being capable of sparing almost all the inside space to storage of cutting string may contain a relatively long cutting string for its size and therefore have a long period of time for replacement of string.

As the working flail of string 14 begins to wear away and become shortened through use, its length can be easily restored to its original proper length by terminating rotation of rotary assembly, by depressing the cap-like cover 40 against the coil spring 60 to the extent that the cap-like cover has the upward projections 45 released from locking engagement with the bores 35 in the reel-like casing 30, and by rotating the cap-like cover 40 in the direction opposite to the winding of string to unwind the string 14 to the extent desired. Thereafter, the cap-like cover 40 has the upward projections 45 fitted in the respective adjacent bores 35 again.

Figure 7:
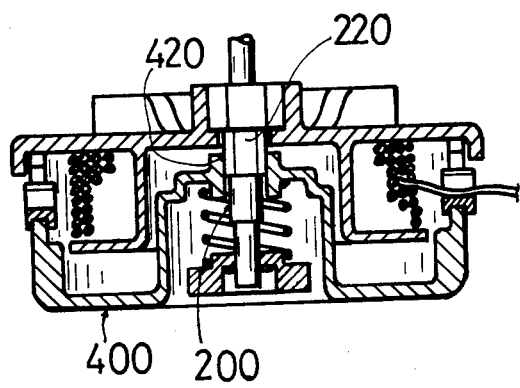
FIG. 7 is a view similar to FIG. 1 but showing another embodiment of the present invention.

Referring now to FIG. 7, there is shown another embodiment of the invention apparatus, in which a stepped axis 200 has an intermediate portion 220 consisting of upper and lower parts. The upper part has a polygonal, preferably hexagonal, cross-section adapted for closely fitting engagement with a polygonal or hexagonal center bore 420 formed in cap-like cover 400. The lower part has a circular cross-section inscribed to the upper part. Therefore, when the cover 400 is forced up to the reel-like casing, it is locked for rotation with the casing due to having the center bore 420 closely fitted with the upper part of intermediate portion 220. While the cover 400 is lowered to the extent that the bore 420 rotatably fits with the lower part of the intermediate portion, it will be released for rotation relative to the casing. In this embodiment, there are eliminated upward projections and bores therefor as provided in the aforementioned embodiment. It will be apparent that this embodiment is in other constructions and operation similar to the embodiment as described above.

It will be understood that a key or spline fitting may be also available for coupling the cap-like cover to the reel-like casing or stepped axis and that, instead of the slot with an acute apex, a hook or the like may be provided for connecting the initial end of cutting string with the reel-like casing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mowing apparatus comprising, in combination, an output axis and rotary power means mounted on supporting means, said output axis being rotatably connected with said rotary power means, a rotary casing detachably and coaxially secured to said output axis for rotation therewith in a cutting plane, said rotary casing including top reel-like and bottom cap-like members adapted to be coupled with each other, said top reel-like member having upper and lower disk portions and an intermediate cylinder portion therebetween, a cutting string made of a high polymer synthetic material coiled about said cylinder portion, said bottom cap-like member having a peripheral wall portion and a centrally upwardly recessed bottom portion for containing therein said intermediate cylinder portion and said lower disk portion of the top member together with said coiled cutting string, a fixing member detachably mounted on said output axis for elastically fixing said bottom member to said top member, at least one guide member provided in said peripheral wall portion of said bottom member, a connecting member provided on said cylinder portion for connecting one end of said cutting string therewith, said cutting string extending through said guide member out of said casing to form a cutting flail with an effective working length in said cutting plane during rotation.

2. The mowing apparatus according to claim 1, wherein said output axis includes a stepped axis detachably secured thereto, said stepped axis consisting of an upper enlarged polygonal head adapted for fitting engagement with a center polygonal recess provided in said top member, an intermediate portion adapted to extend through a center bore below said center polygonal recess in said top member for fitting engagement with a center bore provided in said bottom member, and an end portion extending downwardly within the recess defined by said centrally upwardly recessed bottom portion of said bottom member, said fixing member consisting of a pin put through said end portion of said stepped axis, a washer mounted on said end portion of said stepped axis for engagement with said pin, and a coil spring mounted on said stepped axis and interposed between said washer and said centrally upwardly recessed bottom portion of said bottom member, said washer having in the downward side thereof a groove and a slot each formed larger than said pin, whereby, when said pin is set in said groove, said washer causes said coil spring to elastically fix said bottom member to said top member and whereby, when said pin is in said slot, said washer, said coil spring, said bottom member and said top member are removable from said stepped axis.

3. The mowing apparatus according to claim 2, wherein said bottom member is provided on the upper surface of said peripheral wall with a plurality of circularly equidistantly disposed upward projections for fitting engagement with respective bores formed in the upper disk portion of said top member, whereby, when said bottom member is closely fixed to said top member, said bottom member is coupled with said top member for rotation therewith but said bottom member is released for rotation relative to said top member when said bottom member is lowered to the extent of having said upward projections disengaged from said bores in said upper disk portion of said top member.

4. The mowing apparatus according to claim 2, wherein said intermediate portion of said stepped axis includes upper and lower parts, said upper part having a polygonal cross-section for closely fitting with a polygonal center bore formed in said bottom member, said lower part having a circular cross-section inscribed to said polygonal cross-section of said upper part, whereby, when said bottom member is closely fixed to said top member with said center polygonal bore fitted in said polygonal upper part, said bottom member is locked for rotation with said top member and whereby, when said bottom member is lowered to the extent of having said center polygonal bore fitted with said circular lower part, said bottom member will be released for rotation relative to said top member.

5. The mowing apparatus according to claim 1, wherein said connecting member includes a slot formed in said cylinder portion of said top member, said slot having an acute apex pointed in the direction of winding of string.

6. The mowing apparatus according to claim 1, wherein said guide member includes a guide port in the form of a top-open circle inserted in the underside of an open 8-shaped slit being formed in said peripheral wall portion of said bottom member.

7. The mowing apparatus according to claim 1, wherein said upper disk portion of said top member is provided at the periphery thereof with an annular downward rim for fitting engagement with the peripheral wall portion of said bottom member.

* * * * *